(12) United States Patent
Brescianini

(10) Patent No.: US 10,978,825 B2
(45) Date of Patent: Apr. 13, 2021

(54) COVERING ELEMENT FOR AN ALTERNATOR POLE

(71) Applicant: Davide Brescianini, Pogliano Milanese (IT)

(72) Inventor: Davide Brescianini, Pogliano Milanese (IT)

(*) Notice: Subject to any disclaimer, the term of this patent is extended or adjusted under 35 U.S.C. 154(b) by 0 days.

(21) Appl. No.: 16/628,926

(22) PCT Filed: Jul. 3, 2018

(86) PCT No.: PCT/IB2018/054922
§ 371 (c)(1),
(2) Date: Jan. 6, 2020

(87) PCT Pub. No.: WO2019/008513
PCT Pub. Date: Jan. 10, 2019

(65) Prior Publication Data
US 2020/0220299 A1    Jul. 9, 2020

(30) Foreign Application Priority Data

Jul. 5, 2017 (IT) .................. 102017000075174

(51) Int. Cl.
*H01R 13/52* (2006.01)
*H02K 5/22* (2006.01)

(52) U.S. Cl.
CPC ......... *H01R 13/5213* (2013.01); *H02K 5/225* (2013.01)

(58) Field of Classification Search
CPC ...... H01R 11/284; H01R 4/70; H01R 13/447; H01R 13/52; H01R 13/5213; H01R 13/5219; H01R 11/281; H02K 5/225
See application file for complete search history.

(56) References Cited

U.S. PATENT DOCUMENTS 5,338,898 A * 8/1994 Luciano ............ H01R 4/70
174/138 F
5,346,407 A * 9/1994 Hood ................ B60R 16/04
439/202

(Continued)

FOREIGN PATENT DOCUMENTS

CN    1161762 A    10/1997
CN    203967374 U  11/2014

(Continued)

OTHER PUBLICATIONS

International Search Report dated Sep. 27, 2018 re: Application No. PCT/IB2018/054922, pp. 1-3, citing: US 2004/137315 A1, JP 2013 101891 A and US 5 931 690 A.

(Continued)

*Primary Examiner* — Oscar C Jimenez
(74) *Attorney, Agent, or Firm* — Cantor Colburn LLP

(57) ABSTRACT

A covering element for an alternator pole includes a body which is provided with a portion adapted to be fitted on the alternator pole and a portion adapted to be fitted on the cable that is connected to the alternator pole. The portion of the body which is adapted to be fitted on the alternator pole is provided with coupling teeth which are adapted to allow coupling to a coupling flange of the alternator pole. At least one of the teeth is elastically yielding so as to allow the coupling of the covering element to different diameters of the coupling flange.

8 Claims, 4 Drawing Sheets

(56) References Cited

U.S. PATENT DOCUMENTS

| | | | |
|---|---|---|---|
| 5,399,103 A | | 3/1995 | Kuboshima et al. |
| 5,413,500 A | * | 5/1995 | Tanaka .................... H01R 4/22 439/521 |
| 5,439,759 A | * | 8/1995 | Lippert ................... H01M 2/32 174/138 F |
| 5,576,516 A | * | 11/1996 | Kameyama ............. H01M 2/32 174/138 F |
| 5,931,690 A | | 8/1999 | Sai et al. |
| 2004/0137315 A1 | | 7/2004 | Matsunaga et al. |

FOREIGN PATENT DOCUMENTS

| | | |
|---|---|---|
| EP | 0546710 A2 | 6/1993 |
| GB | 1548715 A | 7/1979 |
| JP | 2013101891 A | 5/2013 |

OTHER PUBLICATIONS

IT Search Report dated Mar. 12, 2018 re: Application No. IT 2017000075174, pp. 1-7, citing: US 2004/137315 A1, JP 2013 101891 A and US 5 931 690 A.

Written Opinion dated Sep. 27, 2018 re: Application No. PCT/IB2018/054922, pp. 1-6, citing: US 2004/137315 A1, JP 2013 101891 A and US 5 931 690 A.

\* cited by examiner

COVERING ELEMENT FOR AN ALTERNATOR POLE

TECHNICAL FIELD

The present disclosure relates to a covering element for an alternator pole. More specifically, the disclosure relates to a covering element for the positive pole of an alternator.

BACKGROUND

As is known, positive poles of alternators have pins of different sizes for an interface for coupling the covering element of the pole.

In practice, the pole is provided with a disk that acts as a support for the coupling and which can have different diameters depending on the manufacturer. This makes it necessary to have covering elements for the pole of different sizes depending on and complying with the different sizes of the disk for supporting the coupling.

This obviously translates to drawbacks from a point of view of the costs of storing different covering elements, and also of increased mounting times caused by the need to choose the correctly-sized covering element for the particular alternator pole that is to be covered.

SUMMARY

The aim of the present disclosure is to provide a covering element for an alternator pole that has a universal size, therefore adaptable to different types of supporting disks for coupling alternator poles.

Within this aim, the present disclosure provides a covering element for an alternator pole that adapts to different coupling diameters so as to standardize the covering element of the pole for the various different coupling interfaces.

The present disclosure also provides a covering element for an alternator pole that can be coupled to cables in such a way that it is captive.

The present disclosure further provides a covering element for an alternator pole that has alternative fastening means, in the event of breakage of the coupling teeth of the covering element, so as to be able to still lock the covering element to the cable and to the pole of the alternator.

The present disclosure also provides a covering element for an alternator pole that is highly reliable, easily and practically implemented and low cost.

This aim and these and other advantages which will become better apparent hereinafter are achieved by providing a covering element for an alternator pole, comprising a covering element body which is provided with a portion adapted to be fitted on the pole of the alternator and a portion adapted to be fitted on the cable that is connected to said alternator pole, characterized in that said portion of the body which is adapted to be fitted on the alternator pole is provided with a plurality of coupling teeth which are adapted to allow coupling to a coupling flange of said alternator pole, at least one of said teeth being elastically yielding so as to allow the coupling of said covering element to different diameters of the coupling flange.

BRIEF DESCRIPTION OF THE DRAWINGS

Further characteristics and advantages of the disclosure will become better apparent from the description of preferred, but not exclusive, embodiments of the covering element according to the disclosure, which are illustrated by way of non-limiting example in the accompanying drawings, wherein.

DETAILED DESCRIPTION OF THE DRAWINGS

Figure 1:
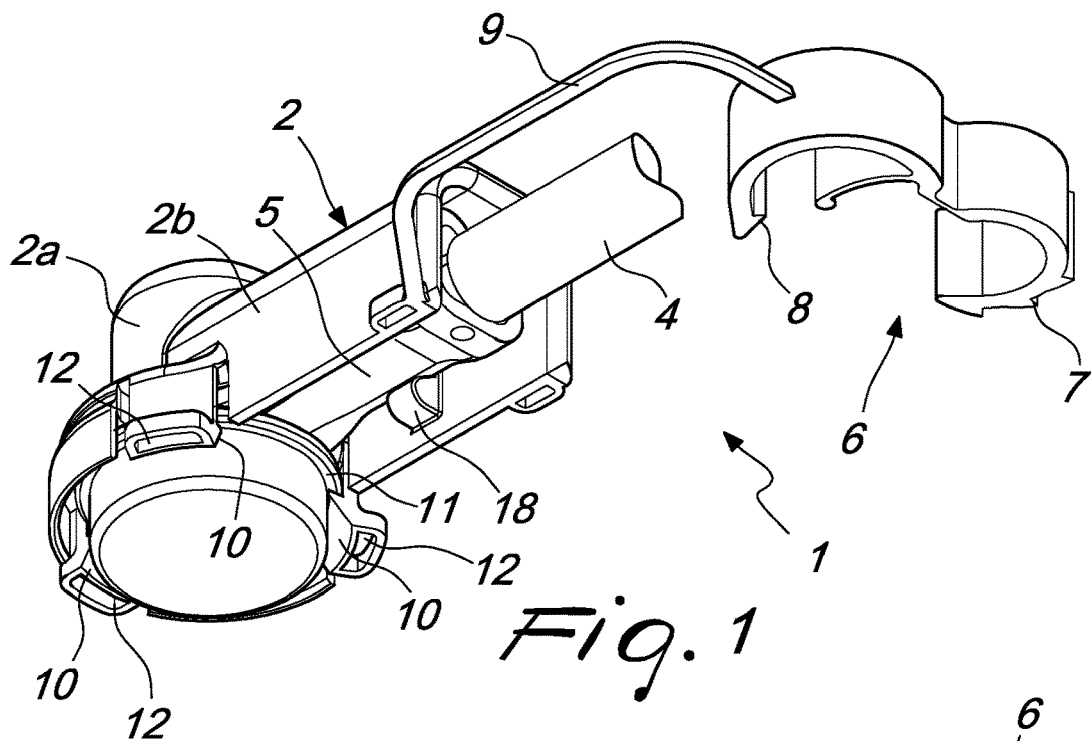
FIG. 1 is an exploded perspective view of the covering element according to the present disclosure.
Figure 2:
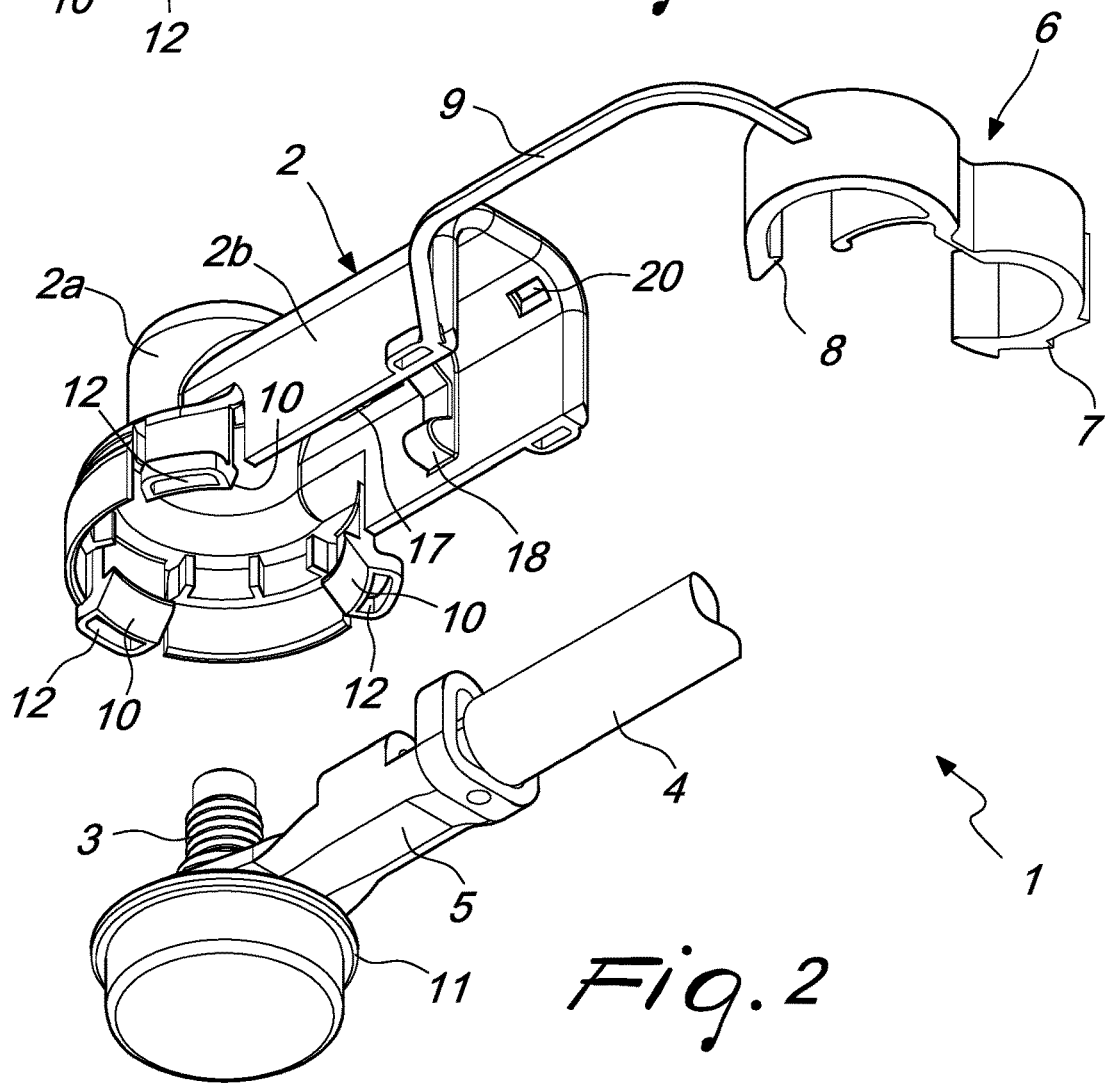
FIG. 2 is a perspective view of the covering element according to the present disclosure.
Figure 3:
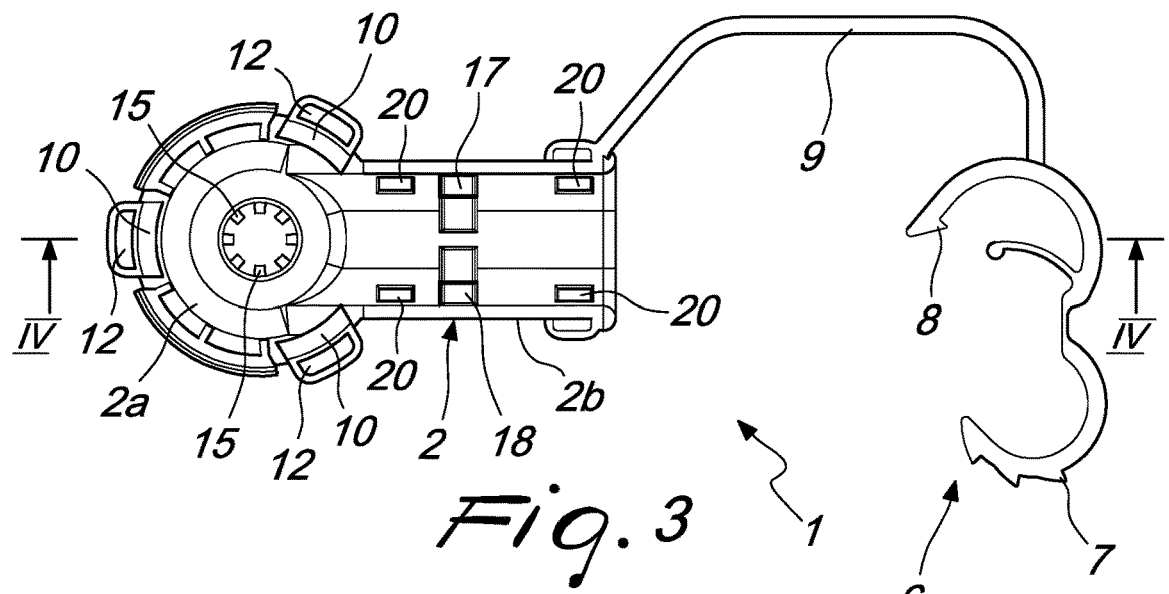
FIG. 3 is a plan view from above of the covering element according to the present disclosure.
Figure 4:
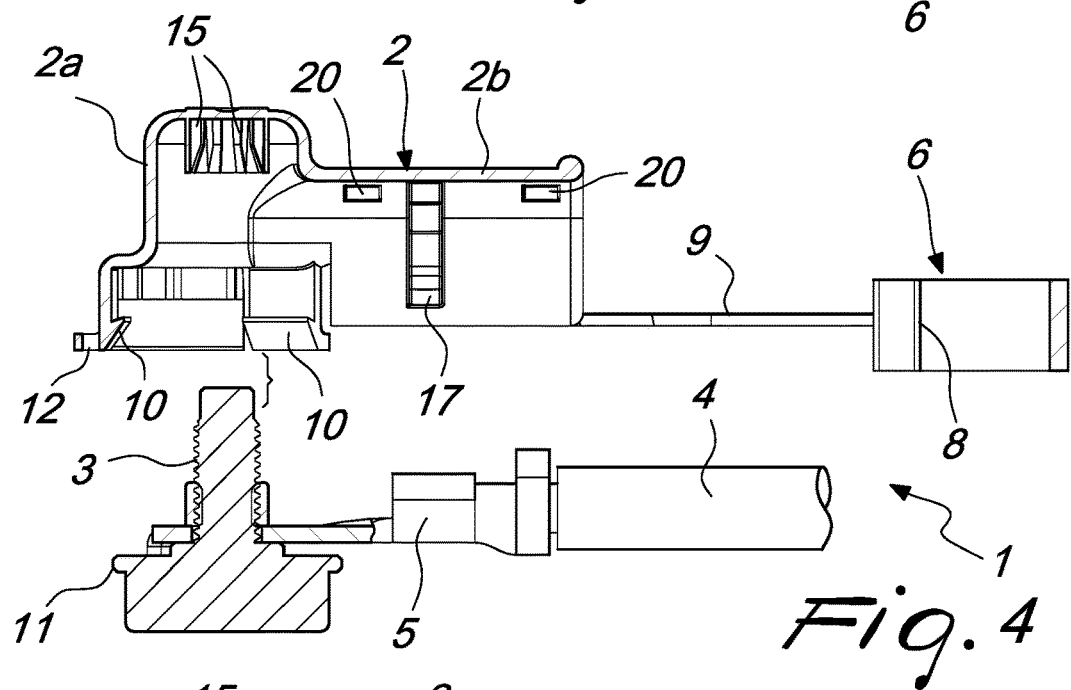
FIG. 4 is an exploded longitudinal cross-sectional view taken along the line IV-IV of the covering element according to the present disclosure.
Figure 5:
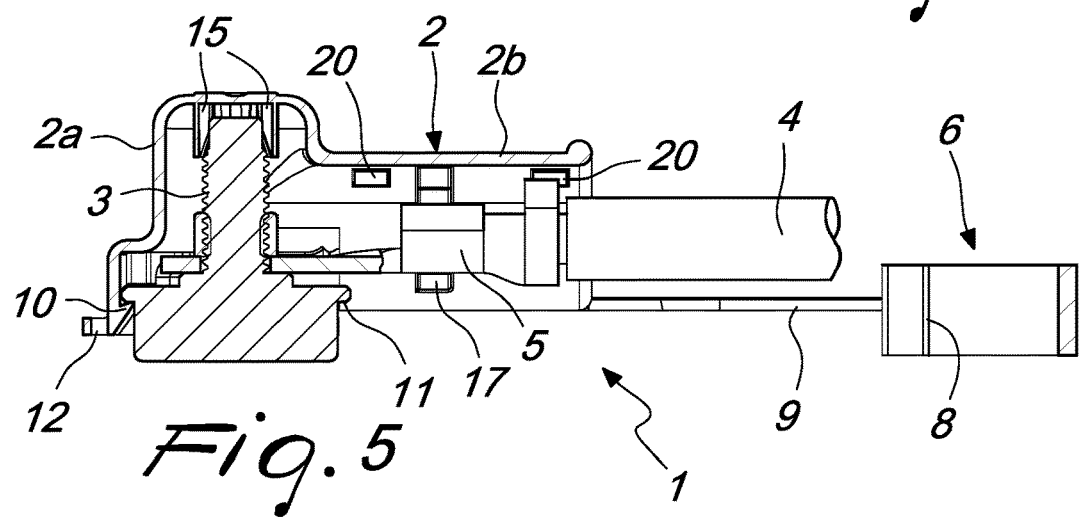
FIG. 5 is a longitudinal cross-sectional view taken along the line IV-IV of the covering element according to the present disclosure.

With reference to the figures, the covering element according to the disclosure, generally designated by the reference numeral 1, comprises a body 2 of the covering element of the alternator pole, which is adapted to be fitted on the pole 3 of an alternator to which a cable 4 with associated FASTON terminal 5 is coupled.

The body 2 of the covering element is divided into a first portion 2a, which is adapted to allow the pin 3 to be covered, and a second portion 2b, which is adapted to allow the FASTON terminal 5 to be covered.

The portion 2b is conveniently provided with a coupling element 6 which is constituted by two semicircles that are hinged to each other, of which one is provided with a plurality of teeth 7 and the other is provided with one tooth 8, with the coupling element 6 being connected in a captive manner to the body 2b by way of a connecting element 9.

Conveniently, the coupling element 6 is adapted to be coupled to the cable 4 so as to make the covering element 1 captive with respect to the cable 4 and to the FASTON terminal 5.

The portion 2a of the body 2 of the covering element according to the disclosure has a plurality of coupling teeth 10 which are made so as to absorb the differences in diameter of a disk 11 that acts as a coupling support. The disk 11 is part of the body of the alternator pole.

The teeth 10 therefore are coupled to the disk or flange 11, centering themselves. The teeth 10 are made so as to absorb the differences in diameter of the disk or flange 11, by virtue of their elasticity and shape. The teeth can be made in various ways in order to achieve the object. For example they can have sharp edges with a slight undercut of approximately 10-15 degrees so that, when they bend outward, they will always maintain a solid coupling situation, or they can be radiused, and the coupling will be of the snap-type both in coupling and in extraction.

Conveniently there are three teeth 10 arranged substantially at 120 degrees with respect to each other, which are adapted to be coupled to the disk or flange 11.

Each one of the teeth is furthermore provided with a slot 12 which protrudes radially with respect to the portion 2a of the body 2 of the covering element according to the disclosure. The slots 12 serve to allow an easy decoupling of the covering element, with the assistance of a specific tool or a screwdriver.

Conveniently, the portion 2a of the body 2 of the covering element is provided internally with a plurality of centering teeth 15 which allow the centering of the portion 2a on the pin 3 of the alternator pole.

Furthermore, the portion 2b is also provided internally with a pair of teeth 17 and 18 which are adapted to perform a retention action with the portion 2b of the body 2 against the cable 4 and therefore allow the crimping of the portion 2b on the cable 4.

In order to achieve the universal coupling of the covering element to any alternator pole, and therefore to any size of supporting disk or flange, at least one and preferably all the teeth 10 of the portion 2a of the body 2 of the covering element are elastically yielding, and are provided with discontinuities with respect to the lower part of the portion 2a of the body 2 of the covering element.

This allows the teeth 10 to splay and so allow the coupling of the portion 2a of the body 2 to any diameter of supporting disk or flange 11 of the alternator pole.

Furthermore, the portion 2b of the body 2 of the covering element is provided with slots 20 which make it possible to affix the body on the cable 4 in the event of breakage of the coupling teeth. The slots 20 allow the fastening of a tie so as to be able to keep the covering element 1 locked to the pole of the alternator, if the teeth 10 are subjected to breakage.

The covering element is centered firstly by the teeth 15, secondly by the teeth 10 and finally by the teeth 17 and 18 which keep the portion 2b of the body 2 of the covering element axially aligned with the cable 4.

Figure 6:
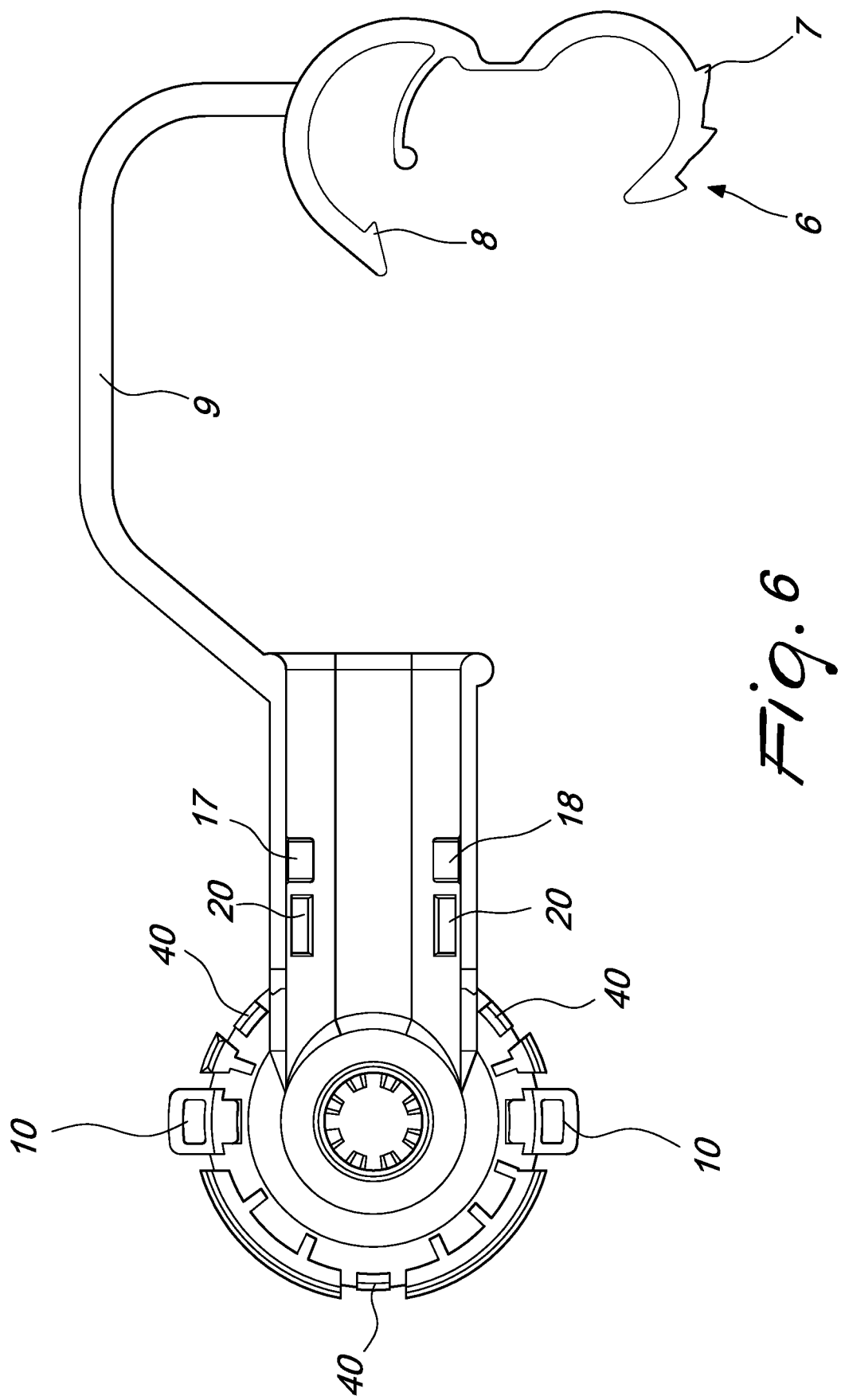
FIG. 6 is a plan view from above of a second embodiment of the covering element according to the present disclosure.
Figure 7:
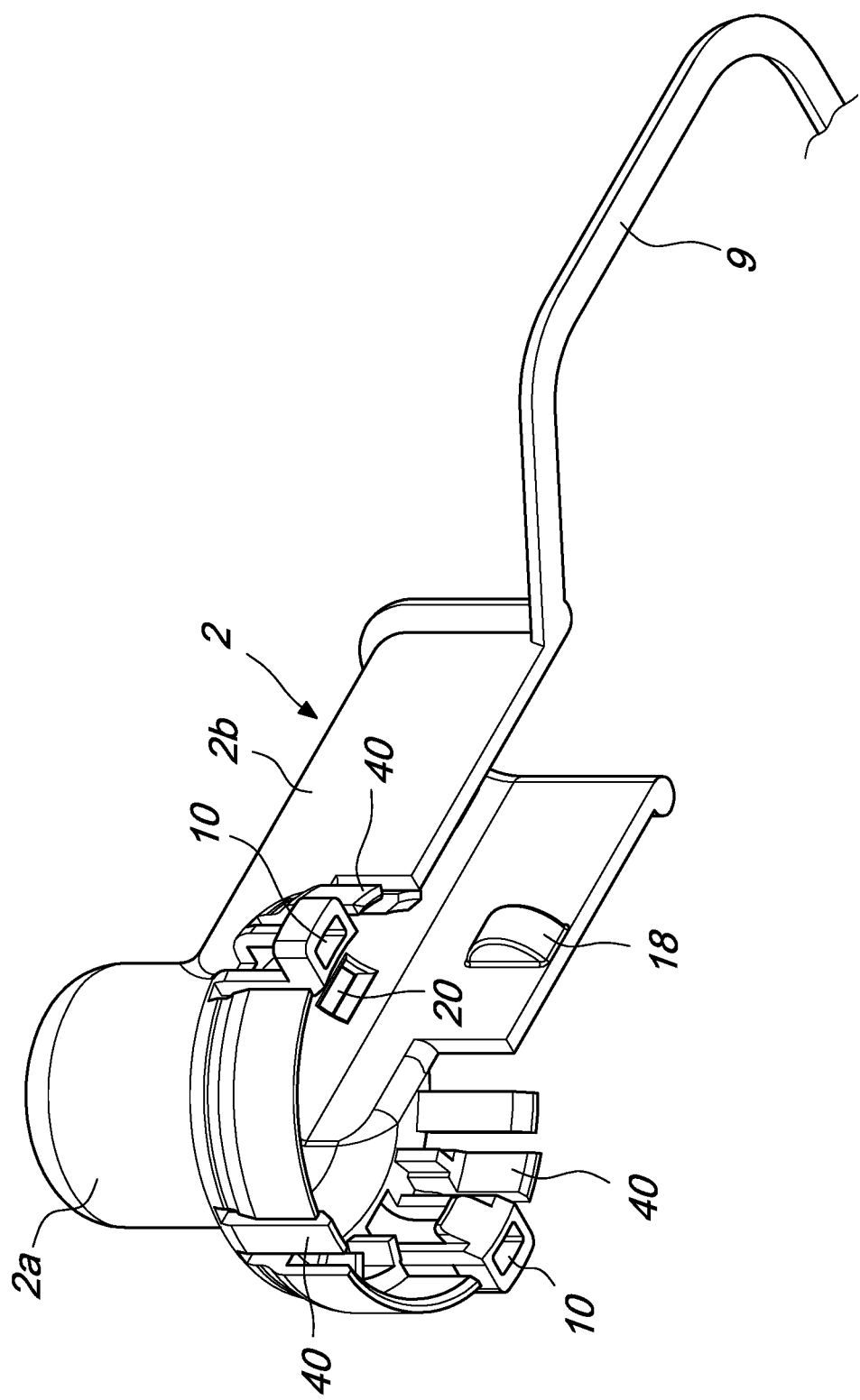
FIG. 7 is a perspective view of the covering element according to the disclosure shown in FIG. 6.

FIGS. 6 and 7 show a second embodiment of the covering element according to the disclosure, wherein there are two coupling teeth 10, which ensure the covering element is retained, and three teeth 40 which act as centering teeth but do not retain the covering element.

In practice it has been found that the covering element according to the disclosure fully achieves the intended aim and advantages in that it makes it possible to adapt to different diameters of coupling disk or flange of the body of the alternator, thus making the covering element universal.

The covering element thus conceived is susceptible of numerous modifications and variations, all of which are within the scope of the appended claims.

Moreover, all the details may be substituted by other, technically equivalent elements.

In practice, the materials used, as well as the contingent shapes and dimensions, may be any according to the requirements and to the state of the art.

The content of Italian patent application no. 102017000075174, the priority of which is claimed in the present application, is incorporated as a reference.

The invention claimed is:

1. A covering element for an alternator pole, the covering element comprising: a body having a portion adapted to be fitted on the alternator pole and a portion adapted to be fitted on a cable that is connected to the alternator pole, wherein said portion of the body which is adapted to be fitted on the alternator pole is provided, at a lower portion thereof and at an outer edge, with a plurality of coupling teeth adapted to allow coupling to a coupling flange of said alternator pole, at least one of said teeth being elastically yielding so as to allow the coupling of said covering element to different diameters of the coupling flange, and wherein said portion of the body of the covering element adapted to be fitted on said alternator pole is provided internally, at an upper portion thereof, with a plurality of centering teeth adapted to allow a centering of said pole with respect to said portion of the covering element adapted to be fitting on the pole of the alternator, said centering teeth being arranged coaxial to the coupling teeth.

2. The covering element according to claim 1, further comprising three coupling teeth which are elastically yielding and are provided with discontinuities with respect to a lower portion of said portion of the body of the covering element which is adapted to be fitted on said alternator pole.

3. The covering element according to claim 1, wherein said portion of the body of the covering element adapted to be fitted on said cable is provided internally with a pair of teeth adapted to allow the coupling of said second portion to said cable.

4. The covering element according to claim 1, wherein said portion adapted to be fitted on the cable is provided with a coupling element which is connected in a captive manner to said portion adapted to be fitted on the cable and is adapted to allow a crimping of said cable.

5. The covering element according to claim 4, wherein said coupling element is provided with a plurality of teeth adapted to allow the crimping of cables of different dimensions.

6. The covering element according to claim 4, wherein said coupling element connected in a captive manner to said portion of the body of the covering element which is adapted to cover said cable is provided in two semicircles, which are mutually connected and are adapted to crimp around said cable.

7. The covering element according to claim 1, wherein said coupling teeth adapted to allow the coupling of the alternator pole to said coupling flange are provided with a slot adapted to allow the insertion of a tool for releasing said teeth.

8. The covering element according to claim 1, wherein said portion of the body of the covering element adapted to cover said cable is provided with a plurality of slots adapted to allow a passage of a tie for the fastening of said covering element to said cable in the event of breakage of said coupling teeth configured for coupling to said flange.

* * * * *